United States Patent [19]

Kikuta

[11] 4,350,383
[45] Sep. 21, 1982

[54] INSTRUMENT BOARD MOUNTING STRUCTURE

[75] Inventor: Masaaki Kikuta, Sayama, Japan

[73] Assignee: Nissan Motor Co., Ltd., Yokohama, Japan

[21] Appl. No.: 60,045

[22] Filed: Jul. 24, 1979

[30] Foreign Application Priority Data

Sep. 8, 1978 [JP] Japan .................. 53/109698

[51] Int. Cl.³ .......................................... B62D 25/14
[52] U.S. Cl. .................................. 296/72; 180/90
[58] Field of Search .............. 296/72, 70; 180/90; 280/752; 293/31, 32, 33, 15

[56] References Cited

U.S. PATENT DOCUMENTS

| | | | |
|---|---|---|---|
| 1,543,819 | 6/1925 | Belden | 296/70 |
| 3,282,622 | 11/1966 | Komenda | 180/90 |
| 3,376,947 | 4/1968 | Barenyi et al. | 180/90 |

FOREIGN PATENT DOCUMENTS 1451816  7/1966  France .
53-142907  5/1978  Japan .
498095  1/1939  United Kingdom .

OTHER PUBLICATIONS

1979 Fisher Body Service Manual, pp. 5-18, FIGS. 5-26, 5-27, 5-28, General Motors Corp., Aug. 1978.

*Primary Examiner*—Joseph F. Peters, Jr.
*Assistant Examiner*—Ross Weaver
*Attorney, Agent, or Firm*—Lane, Aitken, Kice & Kananen

[57] ABSTRACT

An instrument board mounting structure for a vehicle includes an instrument board whose lateral ends are fixed to front pillars, each consisting of inner and outer pillars having a coupled portion of these pillars, so as to cover the coupled portions, thereby facilitating the mounting of the instrument board onto a vehicle body and making it possible to enlarge the instrument board in a transverse direction to provide a larger effective area for instruments and obtain a much more aesthetic appearance.

1 Claim, 5 Drawing Figures

INSTRUMENT BOARD MOUNTING STRUCTURE

BACKGROUND OF THE INVENTION

1. Field of the Invention

This invention relates to an instrument board mounting structure for automobiles and other vehicles for mounting an instrument panel or board onto front pillars, each consisting of an inner pillar or a dash side panel and an outer pillar.

2. Description of the Prior Art

Heretofore, an instrument panel or board for an automobile has been fixed to inner pillars of front pillars for supporting doors. The front pillar generally consists of an inner pillar and an outer pillar having a side surface to which is connected a door by means of hinges. In this case, there is unavoidably a space between the door and a side surface of the instrument board due to screw connections for the board and brackets welded to the inner pillar. Such a space is likely to be conspicuous when the door is closed or opened and can be seen inside the automobile even when the door is closed. It is, therefore, needed to cover this space. In addition, the number of parts and processes for assembling the board are increased due to the absolutely required brackets.

According to another mounting structure, each lateral end of an instrument board is bent and extends along an inner pillar to be directly fixed thereto by means of bolts, so that a space between a closed door and a side surface of the instrument board is smaller than that of the above mentioned conventional board. However, nuts for the bolts are on an opposite side of the board which render it difficult to tighten them.

In any cases of the prior art, an instrument board must be fixed on the inner side of the front pillar, so that a space is unavoidably provided between the board and the pillar and a limitation in construction or aesthetic appearance of lateral ends of an instrument board cannot be avoided.

SUMMARY OF THE INVENTION

It is therefore an object of the invention to provide an improved instrument board mounting structure, which overcomes the above disadvantages in the prior art.

It is a further object of the invention to provide an instrument board mounting structure which facilitates the mounting of an instrument board onto a vehicle body and makes it possible to enlarge the instrument board in a transverse direction to provide a larger effective area for instruments and obtain a much more aesthetic appearance.

In an instrument board mounting structure including an instrument board whose lateral ends are fixed to front pillars each consisting of inner and outer pillars having a coupled portion of these pillars, according to the invention, the lateral ends of the instrument board are fixed to the front pillars so as to cover the coupled portions of the inner and outer pillars.

The invention will be more fully understood by referring to the following detailed specification and claims taken in connection with the appended drawings.

DETAILED DESCRIPTION OF THE PREFERRED EMBODIMENTS

Figure 1:
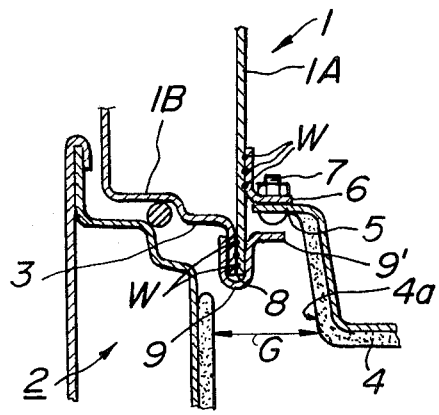
FIG. 1 is a sectional view of an instrument board mounting structure of the prior art.

Referring to FIG. 1 illustrating an instrument panel or board for an automobile secured to an inner pillar of a front pillar for supporting a weight of a door in a conventional manner, the front pillar 1 consists of the inner pillar (which is sometimes a dash side panel) 1A and an outer pillar 1B having a side surface 3 to which is connected a door 2 by means of hinges (not shown) for closing and opening the door. An instrument board 4 is secured at its lateral ends 5 by means of screws 7 and nuts to brackets 6 (only one shown in FIG. 1) welded at W to the inner pillar 1A. The brackets 6 are made in a strong construction to obtain a required rigidity for this purpose and welded to the portions of the inner and outer pillars 1A and 1B in the proximity of the flanges 8 (referred to as "coupled portion" hereinafter) thereof. In this conventional arrangement, however, due to the connection by means of screws 7, there is unavoidably a space G, between the door 2 and a side surface 4a of the instrument board 4, in which the coupled portion is normally exposed. Such a space G is likely to be conspicuous when the door is closed or opened and can be seen inside a vehicle even when the door is closed. It is, therefore, needed to provide a covering 9' inwardly extending from a U-shaped garnish 9 fitted on the coupled portion 8 for blinding the end 5 of the instrument board. In addition, the number of parts and processes for assembling the board are increased due to the absolutely required brackets 6.

Figure 2:
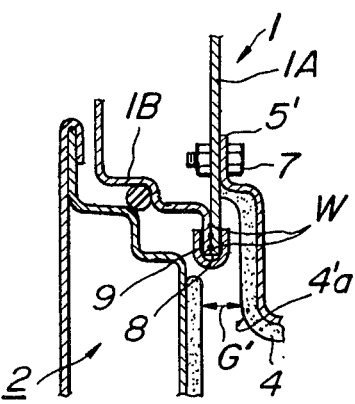
FIG. 2 is a sectional view of another instrument board mounting structure of the prior art.
Figure 4:
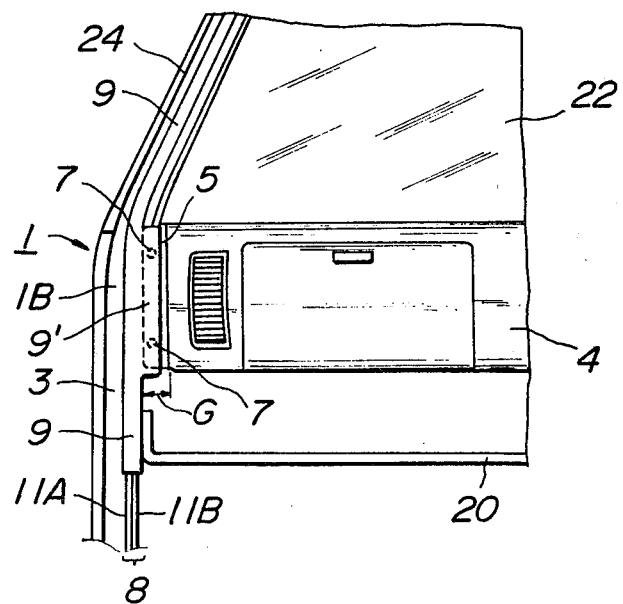
FIG. 4 is a partial elevation of the structure of the prior art shown in FIG. 1, as viewed on an inside of a vehicle.

FIG. 2 illustrates another instrument board 4 in the prior art, wherein each lateral end 5' of the instrument board 4 is bent and extends along an inner pillar 1A to be directly fixed thereto by means of bolts 7, so that a space G' between a closed door 2 and a side surface 4'a of the instrument board is smaller than that in FIG. 1. However, nuts for the bolts 7 are on an opposite side of the board which make it difficult to tighten the bolts and nuts. In any cases of the prior art, the instrument board must be fixed on the inner side of the front pillar 1, so that a space G or G' is necessarily provided between the board and the pillar 1 as shown in FIG. 4 and a limitation in construction of aesthetic appearance of the lateral ends of an instrument board cannot be avoided.

Figure 3:
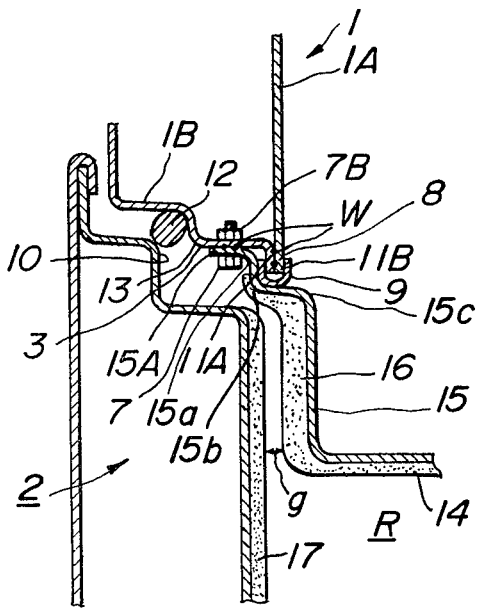
FIG. 3 is a sectional view of one embodiment of the instrument board mounting structure according to the invention.

Referring to FIG. 3 illustrating a preferred embodiment of the instrument board according to the invention, wherein the upper portion in the drawing is on a front end of a vehicle, a front pillar 1 includes a side surface 3 to which is pivotally mounted a door 2 by means of hinges (not shown) for closing and opening the door.

A front pillar 1 consists of an inner pillar (which is sometimes a dash side panel) 1A and an outer pillar 1B having on the side of the inside R of the vehicle respective flanges 11A and 11B which are welded into an integral structure to form a coupled portion 8. The side surface 3 of the outer pillar 1B is formed outwardly of the coupled portion 8 with a shoulder 13 for improving the rigidity of the side surface 3 and for providing a seat for a weather strip 12 for waterproofing between the pillar and the door.

An instrument board 14 according to the invention has lateral ends 15 each extending outwardly beyond the coupled portion 8 of the front pillar 1 to the side surface 3 of the outer pillar 1B facing to the door opening and the distal end 15A of the lateral end is fixed to the side surface 3 by means of screws 7.

Figure 5:
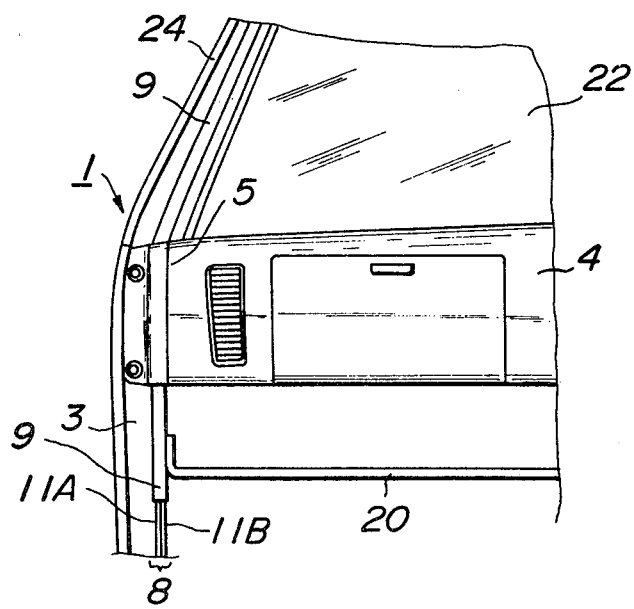
FIG. 5 is a partial elevation of the structure shown in FIG. 3 according to the invention as viewed on an inside of a vehicle.

Nuts 7B for the screws 7 have been fixed by welding to the inside of the outer pillar 1B before the pillars 1A and 1B are connected. A first bent portion 15a connects the distal end 15A to a second bent portion 15b spaced from the side surface 3 of the outer pillar 1B. A distance from the second bent portion 15b to a third bent portion 15c of the lateral end 15 may be determined according to a condition between an instrument panel pad 16 and a lining of the door 2 when closed. A space g between the pad 16 and the lining 17 may be thus freely selected such as zero or more. FIG. 5 illustrates other parts as a package tray 20, a windshield glass 22 and a drip moulding 24.

As can be seen from the above description the instrument board mounting structure according to the invention has following various advantages. The instrument board can be easily mounted to the front pillar because the board is so positioned as to cover the coupled portions of the front pillar. The instrument board can be enlarged in a transverse direction, so that the enlarged board has a large effective area for the instruments. The covering by the garnish can be dispensed with because the board itself covers the coupled portions of the front pillar. Furthermore, the instrument board is mounted at the outer pillars for pivotally mounting the doors, so that the instrument board is advantageously strengthened to increase its rigidity in comparison with the board mounted onto the inner pillar in the prior art.

It is understood by those skilled in the art that the foregoing description is a preferred embodiment of the disclosed structure and that various changes and modifications may be made in the invention without departing from the spirit and scope thereof.

What is claimed is:

1. An instrument board mounting structure of the type which comprises a front pillar which includes an inner pillar connected to an outer pillar having a side surface to which a vehicle door is pivotally mounted for opening and closing the door, the connection between said inner pillar and said outer pillar defining a coupled portion which is normally exposed in the space defined between the inner surface of the door when closed and the most adjacent surface of an instrument board mounted to said front pillar, the side surface of said outer pillar extending outwardly from said coupled portion, the improvement comprising a lateral end on said instrument board fixed to said front pillar and structurally arranged to cover said coupled portion of said inner and outer pillars, said lateral end extending outwardly beyond said coupled portion to said side surface of said outer pillar and being secured thereto by fastening means on the side of the side surface facing said door opening, said lateral end comprising a distal end thereof which is secured to said side surface, a first bent portion connected to said distal end and to a second bent portion, and a third bent portion, spaced from said second bent portion to an extent sufficient to define a condition for determining a zero or greater space between an instrument panel pad and a door lining when said door is closed.

* * * * *